(12) United States Patent
Luo et al.

(10) Patent No.: US 10,324,189 B2
(45) Date of Patent: Jun. 18, 2019

(54) COLLABORATIVE DATA PROCESSING

(71) Applicant: Harman International Industries, Incorporated, Stamford, CT (US)

(72) Inventors: Zheng Luo, Chengdu (CN); Liyun Lv, Shanghai (CN); Qingshan Zhang, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/792,517

(22) Filed: Oct. 24, 2017

(65) Prior Publication Data

US 2019/0120964 A1    Apr. 25, 2019

(51) Int. Cl.
| | |
|---|---|
| *G01S 17/89* | (2006.01) |
| *G08G 1/01* | (2006.01) |
| *G01S 17/02* | (2006.01) |
| *G08G 1/0967* | (2006.01) |
| *G08G 1/00* | (2006.01) |
| *G01C 21/32* | (2006.01) |

(52) U.S. Cl.
CPC .............. *G01S 17/89* (2013.01); *G01C 21/32* (2013.01); *G01S 17/023* (2013.01); *G08G 1/0112* (2013.01); *G08G 1/096791* (2013.01); *G08G 1/20* (2013.01); *B60W 2550/408* (2013.01)

(58) Field of Classification Search
CPC ..... G01S 17/89; G01S 17/023; G08G 1/0112; G08G 1/20; G08G 1/096791; G01C 21/32; B60W 2550/408
See application file for complete search history.

(56) References Cited

U.S. PATENT DOCUMENTS

| | | | | |
|---|---|---|---|---|
| 8,352,112 B2* | 1/2013 | Mudalige | ................. | G08G 1/22 340/435 |
| 8,605,947 B2* | 12/2013 | Zhang | ................ | G06K 9/00798 348/116 |
| 8,825,260 B1* | 9/2014 | Silver | .................. | G01S 17/936 342/118 |

(Continued)

OTHER PUBLICATIONS

European Patent Office, Extended European Search Report Issued in Application No. 18198073.1, dated Mar. 7, 2019, Germany, 9 pages.

*Primary Examiner* — Adnan Aziz
(74) *Attorney, Agent, or Firm* — McCoy Russell LLP

(57) ABSTRACT

Embodiments are disclosed for collaboratively scanning and processing sensor data for building a map of an environment around a group of vehicles. An example an in-vehicle computing system of a vehicle includes a sensor subsystem in communication with an optical sensor, a processor, and memory storing instructions executable by the processor to instruct the optical sensor to scan an assigned region around the vehicle, receive locally scanned data corresponding to the assigned region, process the scanned data to build a first portion of a three-dimensional map, transmit the processed scanned data to at least one other vehicle, receive additional map data from the at least one other vehicle, and build a second, different portion of the three-dimensional map using the received additional map data. In a first example of the in-vehicle computing system, the optical sensor may additionally or alternatively include a Light Detection and Ranging (LiDAR) sensor system.

20 Claims, 7 Drawing Sheets

(56) References Cited

U.S. PATENT DOCUMENTS

| | | | |
|---|---|---|---|
| 9,002,631 B2* | 4/2015 | Taguchi | B60W 40/04 340/435 |
| 9,128,185 B2* | 9/2015 | Zeng | G01S 17/66 |
| 2002/0198660 A1* | 12/2002 | Lutter | G08G 1/0965 701/301 |
| 2009/0079839 A1 | 3/2009 | Fischer et al. | |
| 2010/0198513 A1* | 8/2010 | Zeng | B60W 40/02 701/300 |
| 2013/0242285 A1* | 9/2013 | Zeng | G01S 17/58 356/28 |
| 2014/0358321 A1* | 12/2014 | Ibrahim | G01S 19/14 701/1 |
| 2016/0150451 A1* | 5/2016 | Barreto De Miranda Sargento | H04W 36/14 370/332 |
| 2016/0295589 A1* | 10/2016 | Nikopour | H04W 4/023 |
| 2016/0357187 A1* | 12/2016 | Ansari | G01S 15/931 |
| 2017/0025015 A1* | 1/2017 | Thompson | G08G 1/04 |
| 2017/0025017 A1* | 1/2017 | Thomas | G06K 9/00798 |
| 2017/0162057 A1 | 6/2017 | Ross et al. | |
| 2017/0322314 A1* | 11/2017 | Yang | G01S 19/39 |
| 2018/0105107 A1* | 4/2018 | Hassan-Shafique | B60Q 9/008 |
| 2018/0113200 A1* | 4/2018 | Steinberg | G01S 7/497 |

* cited by examiner ical Sensing) # COLLABORATIVE DATA PROCESSING

FIELD

The disclosure relates to processing data collaboratively between multiple vehicles. The collaboratively processed data includes Light Detection and Ranging (LiDAR) data for generating a digital map of an environment and/or tracking moving objects.

BACKGROUND

Vehicles may be equipped with cameras or other sensing devices to detect surroundings of the vehicles. For example, a vehicle may include a plurality of cameras or other sensors around a perimeter of the vehicle (e.g., on different sides of the vehicle, on a front of the vehicle, on a rear of the vehicle, etc.) to capture a view of a road on which the vehicle is traveling, neighboring vehicles, and/or other objects near the vehicle.

One example of sensing technology used to determine an environment of a vehicle is Light Detection and Ranging (LiDAR), in which a laser light source carried on a vehicle continuously scans surroundings of the vehicle (e.g., 360 degrees of the surroundings). Reflected light from objects in the vehicle surroundings is acquired, indicating a distance from the object. Accordingly, data received from a LiDAR sensor system may include a three-dimensional image of a vehicle surrounding with depth information. A LiDAR dataset may be large (e.g., a 16 beam laser may be used, resulting in the gathering of information regarding reflections from each of the 16 beams), and thereby challenging to process. Since a vehicle may move through an environment quickly, the timeliness of processing data from a LiDAR sensor system may present additional challenges. Some vehicles may offload the processing of LiDAR and other sensor data to cloud-based computing systems via a large-scale wireless network in order to leverage additional computing resources present in such computing systems. However, such an approach may introduce additional transmitting delays, as the cloud-based computing system may be located multiple network hops away from the vehicle and transmission to the cloud-based computing system may be affected by network slowdowns.

SUMMARY

The disclosure provides a different approach for handling large amounts of scanning data from sensing systems such as LiDAR systems in vehicles. In particular, the disclosure provides for near-range collaborated LiDAR fusion, in which vehicles equipped with LiDAR scanning systems are grouped together and negotiate with each other to break down the LiDAR scanning and processing workload. An example in-vehicle computing system includes a sensor subsystem in communication with an optical sensor, a processor, and memory storing instructions executable by the processor to instruct the optical sensor to scan an assigned region around the vehicle, receive, from the optical sensor, locally scanned data corresponding to the assigned region, and process the locally scanned data to build a first portion of a three-dimensional map. The instructions are further executable to transmit the processed scanned data to at least one other vehicle, receive additional map data from the at least one other vehicle, and build a second, different portion of the three-dimensional map using the received additional map data.

An example method for performing group-based LiDAR scanning includes building a three-dimensional map of a collaborative scanning area using both locally scanned and processed data and additional map data, the additional map data being scanned and processed by at least one other vehicle and received from the at least one other vehicle via vehicle-to-vehicle communication.

Another example in-vehicle computing system includes a sensor subsystem in communication with an optical sensor, a processor, and memory storing instructions executable by the processor to discover a second vehicle and a third vehicle within a threshold distance of the first vehicle, form a group with the second vehicle and the third vehicle, assign each of the first vehicle, the second vehicle, and the third vehicle a first, second, and third scan region, respectively, for scanning an environment of the group, each scan region including a portion of a collaborative scanning area around the group, and scan, via the optical sensor, the first scan region and locally process resulting scanned data. The instructions are further executable to send the locally processed scanned data to the second vehicle and the third vehicle, receive, from the second vehicle and the third vehicle, additional map data associated with the second scan region and third scan region, respectively, and build a three-dimensional map of the collaborative scanning area using the locally processed scanned data and the additional map data from the second and third vehicles.

BRIEF DESCRIPTION OF THE DRAWINGS

The disclosure may be better understood from reading the following description of non-limiting embodiments, with reference to the attached drawings, wherein below.

DETAILED DESCRIPTION

When performing an environmental scanning operation using a detailed scanning technology such as LiDAR, a very large amount of point-cloud data is produced. For a single vehicle, the data is a very computationally expensive task to process in real time, and due to movements of the vehicle resulting in advancements through the environment being scanned, the timeliness of processing the scanning data is a concern. The disclosure provides a collaborated scanning (e.g., LiDAR) data processing solution for vehicles including embedded scanning systems (e.g., for use with Advanced Driver-Assistance Systems [ADAS] or auto-driving systems). According to the disclosed solution, vehicles equipped with LiDAR or other scanning systems may negotiate with one another to break down the scanning and processing workload, take different scanning and processing tasks at different angles, and share data with one another to produce a larger range view than that achieved by a single vehicle processing LiDAR data in the same amount of time. In addition to data sharing, the vehicles may also share computing resources and speed up data processing in a manner similar to temporary micro parallel computing systems.

It is to be understood that the disclosure may refer to LiDAR scanning as an example of a scanning operation that generates a large amount of data and may be made more efficient by applying the disclosed collaborative scanning methods and systems. However, the efficiency of the disclosed collaborative scanning methods and systems may also benefit other types of scanning operations. Accordingly, description herein that is directed toward LiDAR scanning and associated data may likewise be applied to any other type of scanning operation (e.g., using two- or three-dimensional cameras, radar, sonar, and/or other sensors adapted to detect objects in an environment) and associated data without departing from the scope of the disclosure.

Figure 1:
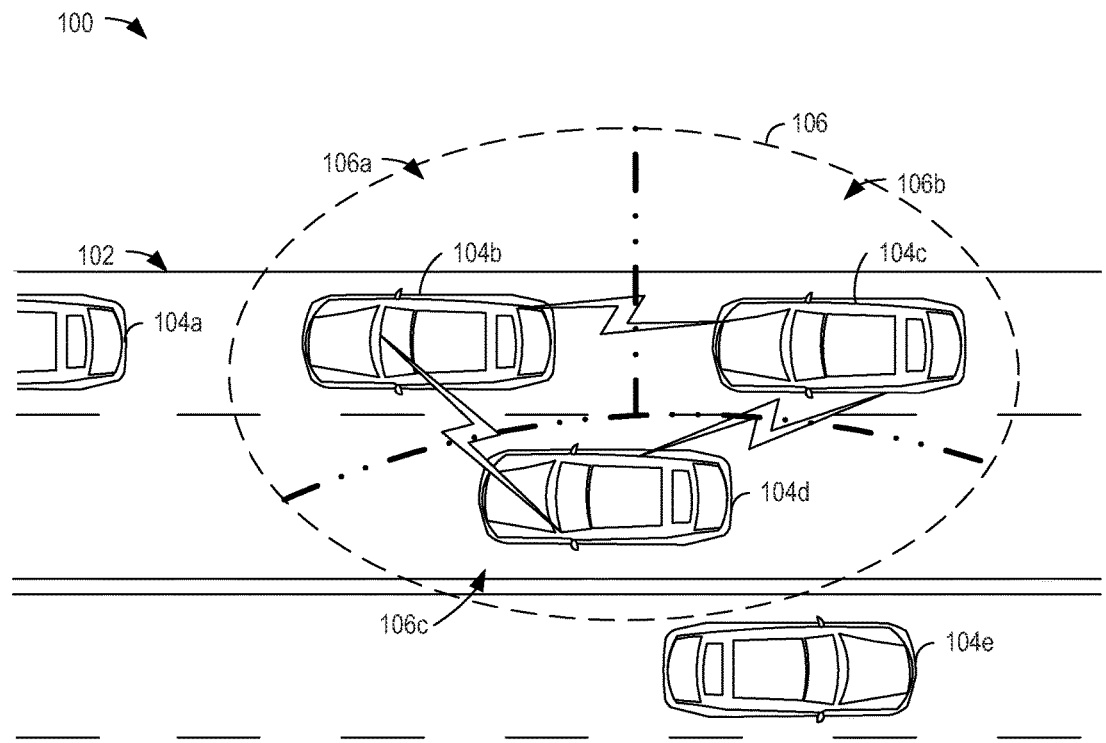
FIG. 1 shows an example vehicle grouping for coordinated scanning operations in accordance with one or more embodiments of the present disclosure.

FIG. 1 illustrates an example scanning environment 100 for a group of vehicles that may perform coordinated LiDAR scanning. Environment 100 includes a portion of a roadway 102, on which vehicles 104a, 104b, 104c, and 104d are travelling in a first direction, and on which vehicle 104e is travelling in a second, opposite direction. Closely driving vehicles 104b, 104c, and 104d having the same driving direction (e.g., meaning that the vehicles will not likely be far away from one another shortly/within a threshold amount of time) may be grouped temporarily. Vehicle 104a may not be grouped with vehicles 104b, 104c, and 104d because the distance between vehicle 104a and any one of the vehicles of the group may be greater than a threshold distance, or because the vehicles may be grouped according to a "three nearest neighbors" vehicle grouping parameter (in which a vehicle groups with the two nearest neighbors to the vehicle to form the three nearest neighbors group) and vehicle 104a is not one of the three nearest neighbors (e.g., each of the vehicles in the group are closer to each other vehicle in the group than to vehicle 104a). Vehicle 104e may not be grouped with vehicles 104b, 104c, and 104d because vehicle 104e is travelling in an opposite direction from the grouped vehicles (e.g., meaning that vehicle 104e will likely be far away from the grouped vehicles shortly/within a threshold amount of time). Each vehicle in the group may be communicatively connected to each other member of the group, via individual direct communication links, as illustrated in FIG. 1, and/or via another ad-hoc communication network.

Once grouped, the combined scanning processes of the vehicles may cover a viewing range 106 representing a 360 degree area around the group of vehicles that may be processed for display as a three-dimensional map of the environment of the vehicles. In the illustrated example, the scanning and processing tasks are distributed such that vehicle 104b is responsible for scanning and processing LiDAR data in area 106a, vehicle 104c is responsible for scanning and processing LiDAR data in area 106b, and vehicle 104d is responsible for scanning and processing LiDAR data in area 106c. When combined, areas 106a-c cover the full viewing range 106. In this way, the processing routines of multiple vehicles may be coordinated to provide 3D map data for a larger region than a single vehicle would be capable of producing in the same amount of time.

Figure 2:
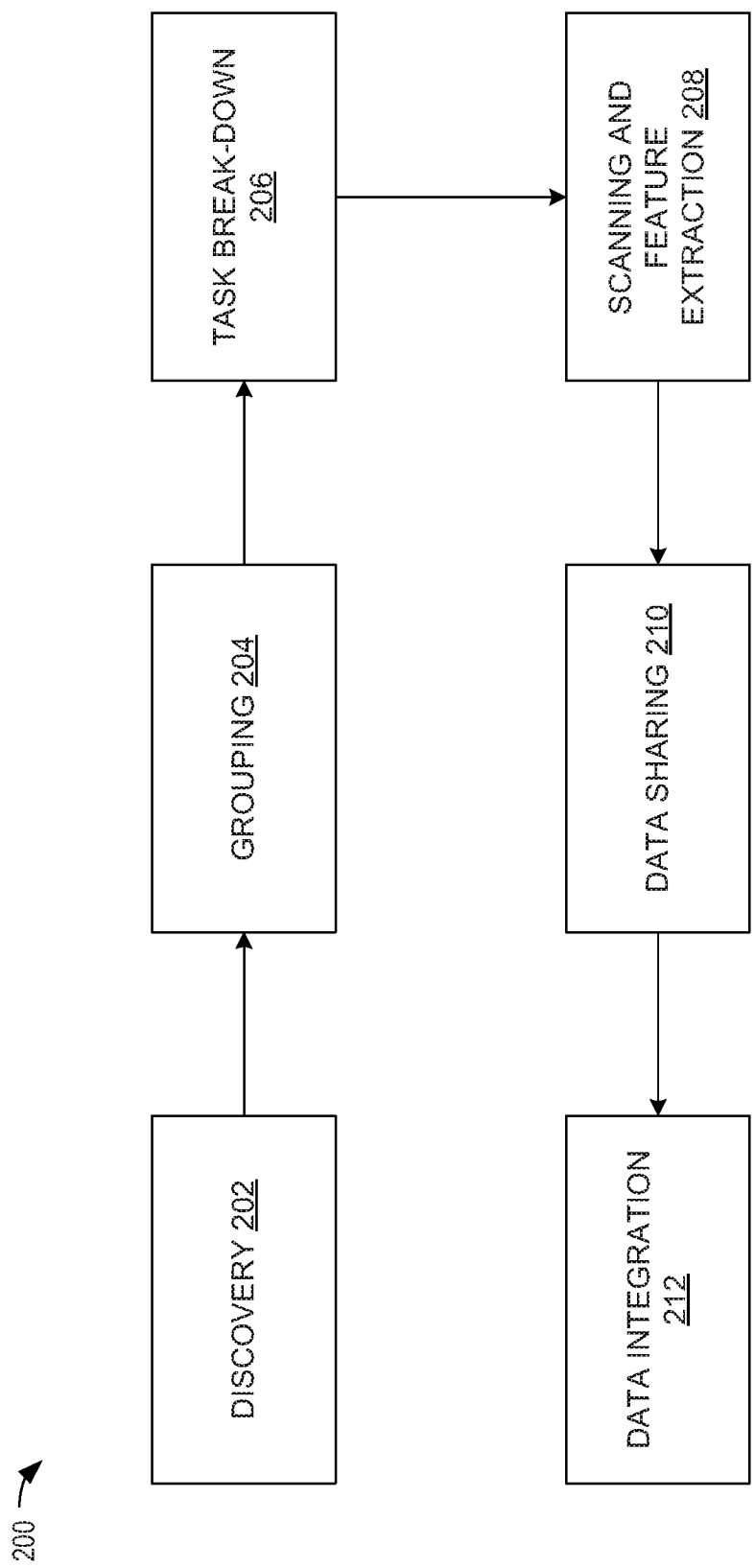
FIG. 2 shows an example processing flow for group-based scanning operations in accordance with one or more embodiments of the present disclosure.

FIG. 2 shows an example processing flow 200 for performing a coordinated scanning operation in a selected vehicle of a group of vehicles. The processing flow may begin at a discovery phase 202. Each vehicle may set associated vehicle information as being discoverable in order to ensure that the vehicles may be identified to one another when data sharing is to be performed. The identification may include LiDAR status, vehicle position, driving direction, and communication protocols that are supported by the vehicle. Accordingly, in the discovery phase, vehicles may receive and broadcast the above-described discovery information and/or send out/respond to requests for the above-described discovery information in order to identify surrounding vehicles. In some examples, a vehicle may continuously or periodically (e.g., based on a time and/or event-based trigger) broadcast vehicle information, a subset of vehicle information, or an announcement-type message indicating that vehicle information is available upon request. A given vehicle may be in a continuous discovery state (to perform actions for the discovery phase) in some examples, whereas in other examples, a vehicle may enter a discovery state responsive to a condition, such as a trigger for starting a scanning operation or a location- or navigation-based trigger (e.g., the vehicle arriving in a location likely to have multiple vehicles, the vehicle starting on a portion of a path of travel with no turn-offs for a threshold distance, etc.).

After the discovery phase, vehicles may enter a grouping phase 204. In the grouping phase, vehicles may evaluate information acquired during the discovery phase in order to determine a grouping of nearby vehicles. One way for grouping to be performed is to determine a group of k nearest neighbors, where k is a non-zero positive integer. For example, a group of 3 nearest neighbors may be formed using received discovery information. Additional information may be used for grouping vehicles. For example, locations and directions of vehicles on roads, as well as predicted routes of vehicles on roads, may be used to divide vehicles into several groups. In some examples, groups may be formed to remain unchanged for a threshold amount of time (e.g., vehicles travelling in the same direction may be grouped, as the likelihood that a vehicle in the group will become spaced from other vehicles in the group by a threshold distance may be low). In contrast, vehicles travelling in opposite directions may not be grouped, as the vehicles may only be within the threshold distance for a very short amount of time. Vehicle speed and traffic information may also be a factor for grouping. For example, vehicles within a threshold distance of one another that are travelling in opposing directions but stuck in stopped traffic may be grouped if the traffic information indicates that the vehicles will be stopped for a threshold amount of time (e.g., an estimated amount of time to perform a coordinated LiDAR scan of the vehicles' current environment).

Once discovered and grouped, vehicles may enter a task break-down phase 206 to break down and distribute scanning tasks to achieve efficient point-cloud data collection and processing. For example, each vehicle may be assigned to process a certain range (e.g., in degrees) of LiDAR data (e.g., a region within a threshold distance of the vehicle and/or within a threshold angle around the vehicle). In some examples, each vehicle may be assigned a different, non-overlapping region of a collaborative scanning area to scan and process. In other examples, each vehicle may be assigned a different region of the collaborative scanning area to scan and process, and one or more of the different regions may be partially overlapping. In examples where partially overlapping regions are assigned, scanned/processed data in the overlapping region may be used to align data received from other vehicles to one another and/or to locally processed data. In instances where there are differences between processed data in overlapping regions, these differences may be resolved by averaging the data from the different sources and/or selecting the data from one source (e.g., locally processed data or the data from a master vehicle).

In some examples, a selected (e.g., master) vehicle may control task distribution amongst the vehicles in the group. The selection of the master vehicle may be performed based on predetermined criteria (e.g., location-based criteria, such as a center-most vehicle within the group/scanning region of the group, capability-based criteria, such as the vehicle with the most processing power of the group, etc.) or may be negotiated during the grouping phase. In still other examples, the task distribution may be assigned via a remote system such as a cloud-based computing system in communication with one or more of the vehicles of the group.

After determining distribution of tasks, the vehicles may enter a scanning and feature extraction phase 208. During the scanning and feature extraction phase, each vehicle may scan a local environment of the vehicle (e.g., a region around the vehicle as determined during the task break-down phase 206) and extract features based on collected point-cloud data (e.g., using local processing resource, without sending data to any cloud-based or other computing system for processing). Example processing that may occur during the scanning and feature extraction phase is discussed below with respect to FIG. 5.

Once each vehicle completes the scanning and feature extraction phase for the associated region around the vehicle, the processing flow continues to the data sharing phase 210. During the data sharing phase, the processed and/or any unprocessed LiDAR data from the scanning and feature extraction phase are shared amongst all vehicles in the group. For example, each vehicle may broadcast the data to be shared (e.g., with an encryption and/or other security scheme that is predetermined for the group) or the data may be transmitted sequentially or in parallel via direct vehicle-to-vehicle communication. A communication protocol, such as peer-to-peer/point-to-point (P2P) sharing, may be utilized to coordinate communications between the vehicles.

Upon receiving LiDAR (e.g., processed LiDAR) data from each other vehicle in the group, the vehicles may enter a data integration phase 212. In the data integration phase, each vehicle may integrate the data collected and processed locally with the data collected and processed by the other vehicles in the group. The integration process may be streamlined since the task break-down (as determined in the task break-down phase 206) is known to each vehicle (e.g., such that scanned data from a particular vehicle may be associated with the scanning region/task for that vehicle).

Figure 3:
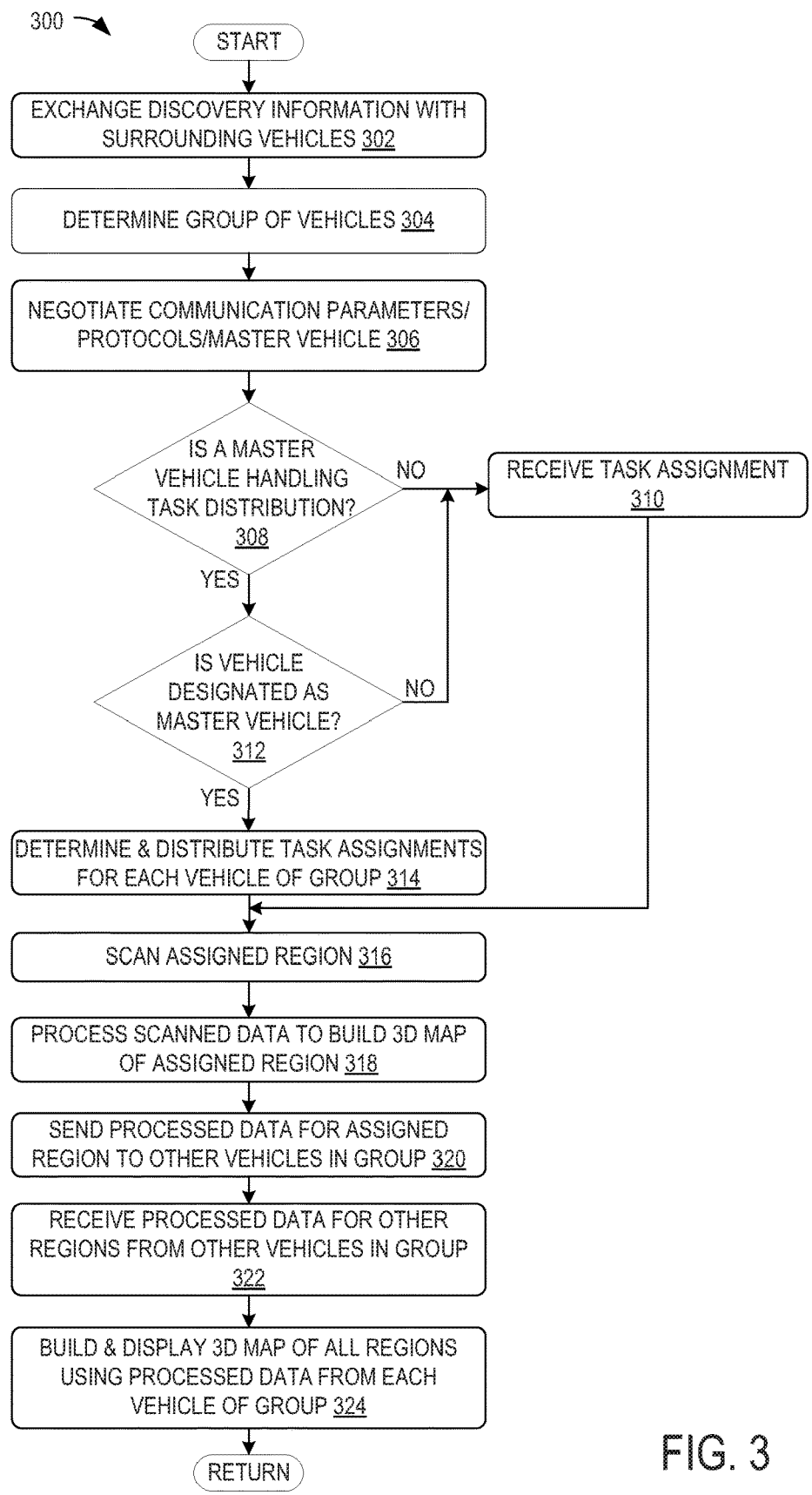
FIG. 3 shows a flow chart of an example method for performing a collaborative scanning operation in accordance with one or more embodiments of the present disclosure.

FIG. 3 is a flow chart of an example method 300 for performing a collaborative scanning operation using multiple vehicles. For example, method 300 may be performed by one of the grouped vehicles (e.g., vehicle 104*b*, 104*c*, or 104*d*) in FIG. 1 using processing resources (e.g., an in-vehicle computing system and associated processors) and sensing elements (e.g., a LiDAR sensor system) of the vehicle. At 302, the method includes exchanging discovery information with surrounding vehicles. For example, as described above, the vehicle may broadcast discovery information and/or a request for discovery information in order to identify neighboring vehicles in a vicinity of the vehicle. Upon receiving information from the neighboring vehicles, one or more of the vehicles and/or an external service (e.g., a cloud-based computing system) may determine a grouping of the neighborhood vehicles, as indicated at 304. Vehicles may be grouped according to proximity (e.g., x nearest neighbors), capabilities (e.g., processing power, sensor systems, communication protocols compatibility, security protocols, etc.), and/or other parameters.

Throughout execution of method 300, the grouping of vehicles may be dynamically adjusted and/or created in an ad hoc manner. For example, as vehicles move out of proximity of other vehicles in the group (e.g., move to beyond a threshold distance from at least one member of the group), those vehicles may be removed from the group. Likewise, as vehicles move into proximity of other vehicles in the group (e.g., move to within a threshold distance from at least one member of the group and/or displace a member of the group by becoming nearer to other members of the group than the displaced member), those vehicles may be added to the group. When an x nearest neighbors grouping is utilized (e.g., where x is a positive non-zero integer greater than one), the grouping may be continuously adjusted to maintain the x nearest neighbors as vehicles change relative distances from one another. In such examples, a static number of vehicles are maintained in the grouping, such that the adding of a new member results in the removal of another existing member, and a member is only removed if another new member is able to be added (e.g., a vehicle that moves outside a threshold distance of other vehicles may be kept in the group if no other non-grouped vehicles are nearer the group members than that vehicle). In some examples, a group may not be formed, or an existing group may be disbanded, if fewer than the static number (e.g., x) of vehicles are available to be grouped (e.g., when fewer than x vehicles are within a threshold distance of one another).

When other distance-based groupings are used, any number of vehicles may be included in a group, such that adding a new member does not necessarily result in removing an existing member (unless the existing member moves outside of the threshold distance from the other vehicles), or any number up to a maximum number of vehicles may be included in a group, such that adding a new member only results in removing an existing member if the maximum number of group members has already been reached.

In any of the described examples, the threshold distance between vehicles of the group may be based on static or dynamic parameters. For example, the threshold distance may be based on a distance between one or more pairs of vehicles (e.g., twice the distance between the closest or furthest members of the group) and/or a size of the roadway (e.g., where the threshold distance increases as the roadway size/number of lanes decreases). In additional or alternative examples, the threshold distance may be based on a type of vehicles to be grouped (e.g., motorcycles may be associated with smaller thresholds than four-wheeled or larger vehicles, or a threshold may be set as three times a length of a vehicle in the group), environmental conditions (e.g., weather, visibility, type of region [e.g., city versus rural], etc.), and/or other factors. In some examples, the threshold distance may be predetermined or based on a predetermined factor, such as a number of vehicles to be grouped/a type of grouping, a user-specified parameter, a stored value, etc. Vehicles to be grouped may negotiate the parameters of grouping, such that a single vehicle may be selected to determine the parameters, or a compromise (e.g., averaging requested thresholds) may be reached between vehicles to be grouped. In some examples, grouped vehicles may be maintained in the same group for a threshold period of time (e.g., an amount of time to perform one iteration of environmental scanning/processing) and/or may only adjust grouping at particular periodic points in time (e.g., at moments before or after an iteration of environmental scanning/processing is started or completed, such as immediately after scanned data is shared amongst vehicles of the group).

At 306, the method includes negotiating communication parameters, protocols, and/or designation of a master vehicle. For example, selection of the above-described features may be performed by a single vehicle (e.g., a master vehicle, randomly selected or selected based on capabilities/statuses of the vehicles, such as the first to initiate discovery, the vehicle with the most processing power/largest sensing system, newest vehicle, vehicle with the strongest wireless signal, etc.) and/or may be decided through coordinated agreements between each vehicle of the group. In still other examples, a remote device (e.g., a cloud-connected computing system coupled to at least one of or each member of the group) may determine one or more of the negotiated parameters and distribute indications of the determined parameters to each member of the group.

At 308, the method includes determining whether a master vehicle is handling task distribution. If a master vehicle is not handling task distribution (e.g., "NO" at 308), the method proceeds to 310 to receive task assignment (e.g., from a cloud computing device or other entity). If a master vehicle is handling task distribution (e.g., "YES" at 308), the method proceeds to 312 to determine whether the subject vehicle (the vehicle performing the method) is designated as the master vehicle. If the subject vehicle is not designated as the master vehicle (e.g., "NO" at 312), the method proceeds to 310 to receive task assignment (this time from the master vehicle). If the subject vehicle is designated as the master vehicle (e.g., "YES" at 312), the method proceeds to 314 to determine and distribute task assignments for each vehicle of the group. For example, the task assignments may be determined based on a position of each vehicle of the group (e.g., a rearmost vehicle may be tasked with scanning and processing data for a rearmost region of the collaborative scanning area, a leftmost vehicle may be tasked with scanning and processing data for a leftmost region of the collaborative scanning area, etc.) and/or the capabilities of each vehicle of the group (e.g., a size and/or shape of a region assigned to a vehicle for scanning and processing may be based on an amount/positioning of sensors on the vehicle and an amount of processing resources available to the vehicle).

Once task assignments have been determined/distributed and/or received, the method includes scanning the assigned region at 316. For example, the vehicle may utilize LiDAR sensors and/or other sensor systems to gather sensor data regarding the assigned region (e.g., a region around the vehicle). At 318, the method includes processing the scanned data to build a three-dimensional map of the assigned region. For example, the scanned data may indicate the location of objects, terrain, and/or other elements in the region, which may be rendered for display on a three-dimensional map of the region.

At 320, the method includes sending the processed data for the assigned region to the other vehicles in the group. The processed data may be sent as a broadcast to other vehicles in the group, directed to other vehicles in the group via addressing determined in the discovery phase, and/or sent via a daisy chain or other networking scheme. Data may be transmitted based on a vehicle-to-vehicle (V2V) protocol in which encryption is already defined (e.g., the data may be encrypted or the data may include a digital signature). In examples where data is broadcasted, the data may be broadcasted at a 10 Hz rate and/or another rate defined by the communication protocol negotiated at 306. In some examples, each vehicle may send data to each other vehicle in messages that include or are appended with a group identification code uniquely identifying the group in which the vehicle belongs. In some examples, each vehicle may communicate to a cloud computing system for distribution of the data to the vehicles of the group.

At 322, the method includes receiving processed data for other regions from other vehicles in the group. The data received at 322 may be the same type of data that the vehicle sent out at 320, but may be designated for a different region of the three-dimensional map of the collaborative scanning area. For example, each vehicle may perform the same processing/scanning tasks, but for a different region of the collaborated scanning area. In some examples, the processed data may be sent and received with identifying information indicating the region with which the data is associated. In other examples, the region with which the data is associated may be known based on the vehicle from which the data is received (e.g., a look-up table, built at each vehicle based on negotiated data/task assignment and/or shared amongst the vehicles [e.g., sent during the task assignment phase] may associate each vehicle of the group with an associated region of the collaborative scanning area). At 324, the method includes building and displaying (e.g., at a local display of the vehicle performing the method) a three-dimensional map of all regions of the collaborative scanning area using the processed data from each vehicle of the group (including the local processed data sent at 320). For example, the three-dimensional map may include data processed locally at the vehicle and additional data that is not scanned at the vehicle, is not based on data scanned at the vehicle, and is not processed at the vehicle (or is less processed than the data locally processed at the vehicle, e.g., only processed to integrate the data with locally processed data to build the three-dimensional map).

Figure 4:
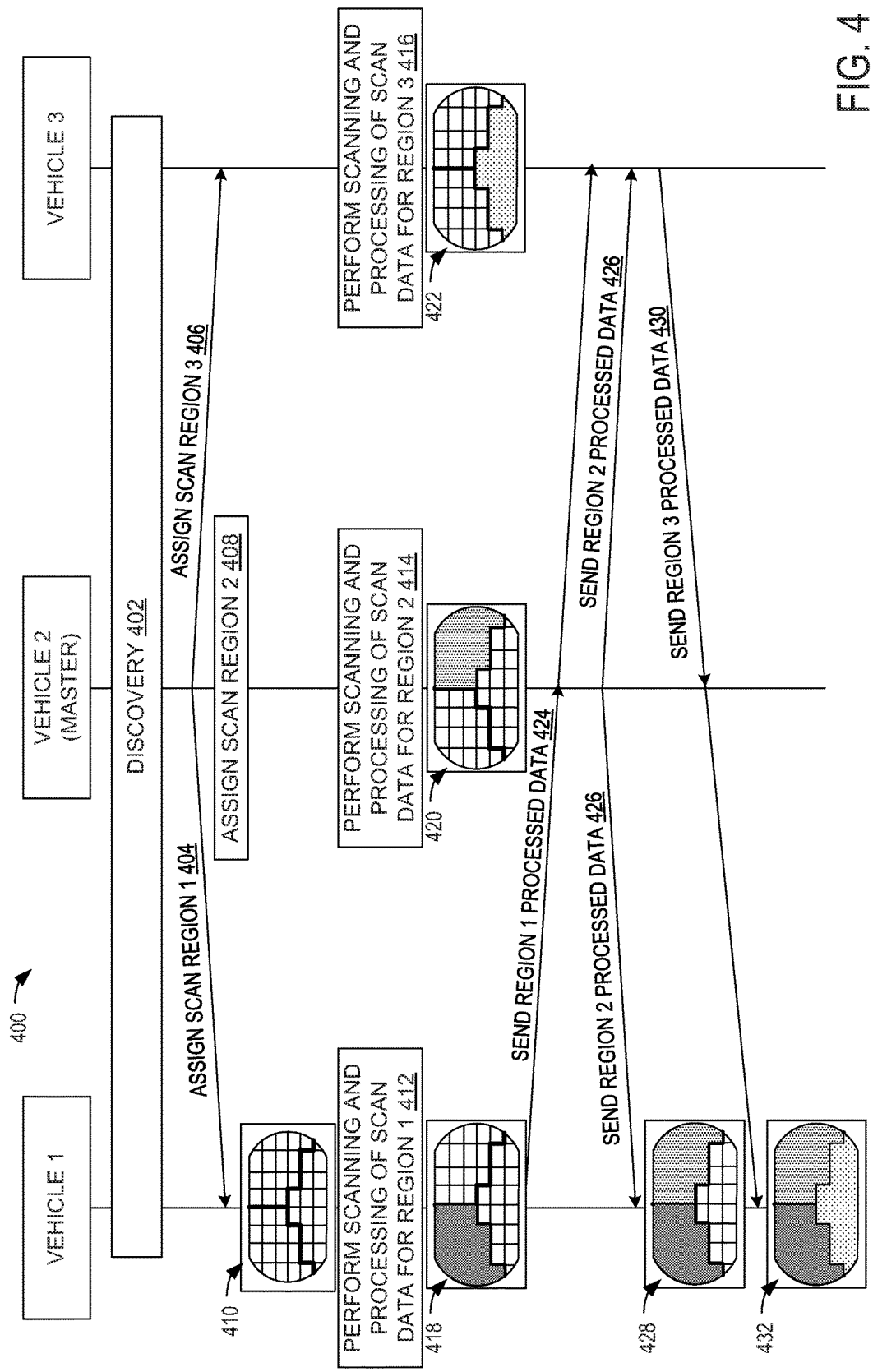
FIG. 4 shows an example communication diagram for data exchanged during a group-based scanning operation in accordance with one or more embodiments of the present disclosure.

FIG. 4 shows an example communication diagram 400 for operations performed between three grouped vehicles to provide a collaborative scan of a region around the group of vehicles. The group includes vehicle 1, vehicle 2 (designated as a master vehicle), and vehicle 3 in the illustrated example, however groups having fewer or more vehicles may perform similar communications and associated operations without departing from the scope of this disclosure. At 402, each of the vehicles participates in a discovery phase, in which the vehicles exchange discovery information identifying each vehicle and/or providing other information regarding each vehicle (e.g., capabilities of the vehicle, preferences of the vehicle, location of the vehicle, etc.). Since vehicle 2 is the master vehicle, assignments of scanning tasks are sent from vehicle 2 to each of vehicles 1 and 3. Accordingly, at 404, vehicle 2 sends to vehicle 1 an assignment to scan region 1 (e.g., a first portion of a collaborative scanning area around the group of vehicles), and at 406, vehicle 2 sends to vehicle 3 an assignment to scan region 3 (e.g., a third portion of the collaborative scanning area around the group of vehicles). At 408, vehicle 2 assigns itself (vehicle 2) to scan region 2 (e.g., a second portion of the collaborative scanning area around the group of vehicles). Together, regions 1, 2, and 3 may form the full collaborative scanning area around the group of vehicles. 410 illustrates a 3D map including an initial state of a representation of the collaborative scanning area before any scanning/processing/map building is completed. Although shown only for vehicle 1 to reduce clutter in the communication diagram 400, it is to be understood that each vehicle 1, 2, and 3 may include the same or a similar representation of the collaborative scanning area.

At 412, 414, and 416, respectively, each vehicle performs scanning and processing of scan data for the associated assigned region (e.g., vehicle 1 scans/processes data for region 1, vehicle 2 scans/processes data for region 2, and vehicle 3 scans/processes data for region 3). As shown, each of the vehicles may perform the scans/data processing in parallel with one another and/or simultaneously with one another in order to speed up the process relative to a single vehicle sequentially scanning/processing each region. At 418, a representation of the result of the scanning/processing performed at 412 for vehicle 1 is shown. In particular, a first portion of the 3D map (the upper left portion, corresponding to region 1) is shaded, representing the built status of that portion of the map. At 420, a representation of the result of the scanning/processing performed at 414 for vehicle 2 is shown. In particular, a second portion of the 3D map (the upper right portion, corresponding to region 2) is shaded, representing the built status of that portion of the map. At 422, a representation of the result of the scanning/processing performed at 416 for vehicle 3 is shown. In particular, a third portion of the 3D map (the bottom portion, corresponding to region 3) is shaded, representing the built status of that portion of the map.

At 424, vehicle 1 sends the region 1 processed data to vehicle 2 and vehicle 3. At 426, vehicle 2 sends the region 2 processed data to vehicle 1 and vehicle 3. Responsive to receiving the region 2 data, vehicle 1 fills in the corresponding portion of the 3D map, as shown at 428. It is to be understood that a similar process is performed at vehicles 2 and 3 responsive to receiving processed data from other vehicles, however only the 3D map filling of vehicle 1 is illustrated in order to reduce clutter in communication diagram 400. At 430, vehicle 3 sends region 3 processed data to vehicle 1 and vehicle 2. Responsive to receiving the region 3 data, vehicle 1 fills in the corresponding portion of the 3D map, as shown at 432, thereby resulting in a 3D map for the full collaborative scanning area that is built using data from all of the vehicles of the group.

Figure 5:
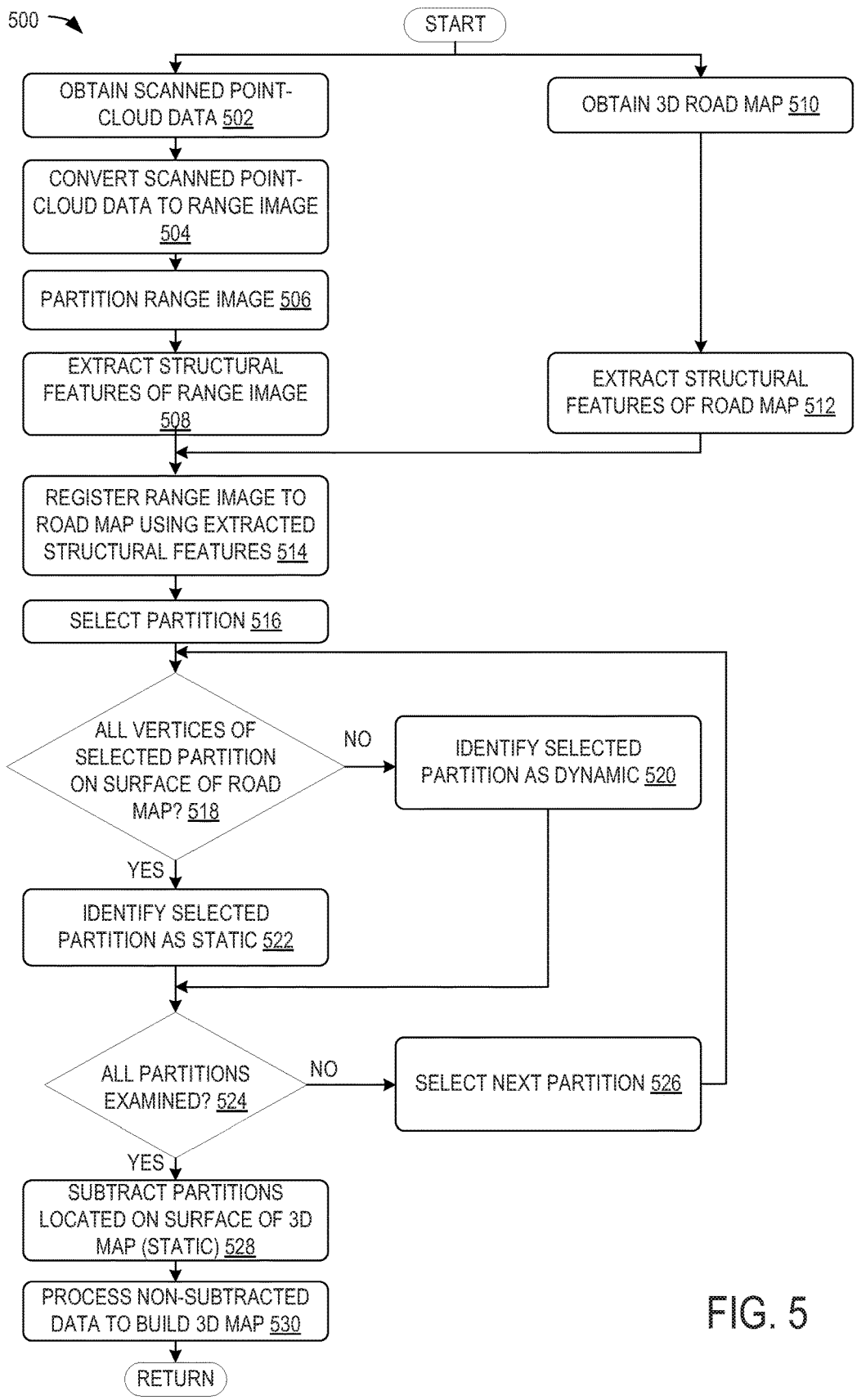
FIG. 5 is a flow chart of an example method for processing LiDAR data in accordance with one or more embodiments of the present disclosure.

FIG. 5 is a flow chart of an example method 500 for processing scanned data in a vehicle. For example, method 500 may be performed during the scanning and feature extraction phase 208 of FIG. 2 and/or at 318 of method 300 of FIG. 3 in order to further reduce processing time and resource usage by only processing data that has changed from a prior scan. Accordingly, method 500 may be performed by an in-vehicle computing system or other vehicle-based processing device in coordination with a scanning system (e.g., a LiDAR scanning system) of a vehicle that scans an environment around the vehicle.

At 502, the method includes obtaining scanned point-cloud data (e.g., from a scanning system that scans an environment around a vehicle). The point-cloud data may be raw LiDAR data from a given vehicle of a collaborative scanning process. In some examples, the point-cloud data may not have as much texture information as data captured using cameras. At 504, the method includes converting the scanned point-cloud data to a range image. The range image may include a two-dimensional image, where each data point has depth information. The range image may have a smaller size than the point-cloud data. At 506, the method includes partitioning the range image for classifying individual portions of the range image. For example, the range image may be partitioned using a mesh (e.g., a square or other shape, such as triangle) to divide the range image into different regions. The mesh size may depend on the size of a predetermined minimal object on the road (e.g., a road reflector, a road sign, a rock, etc.). At 508, the method includes extracting structural features of the range image. For example, edge detection or other object mapping algorithms may be used to determine features present in the range image (e.g., objects in the environment).

At 510, the method includes obtaining a three-dimensional road map. For example, the three-dimensional road map may have been built during a previous iteration of a scanning/processing method (e.g., at an immediately prior iteration) and/or may be obtained from another source (e.g., a navigation database using a current location of the vehicle). Accordingly, the obtained road map may include at least a portion of the environment for which scanned point-cloud data is obtained at 502. At 512, the method includes extracting structural features of the road map. For example, edge detection or other object mapping algorithms may be used to determine features present in the road map (e.g., objects in the environment). In some examples, the same algorithms used to extract structural features of the range image may be used to extract structural features of the road map. In other examples, different algorithms may be used for the range image and/or road map. The road map may be obtained and the structural features of the road map may be extracted at any time prior to performing the following operations of method 500 (e.g., the operation at 514, described below). For example, the road map may be obtained and/or structural features may be extracted from the road map simultaneously while performing one or more of 502-508 in some examples. In other examples, the road map may be obtained and/or structural features may be extracted from the road map before or after performing one or more of 502-508.

At 514, the method includes registering the range image to the road map using the extracted structural features. For example, the range image may be aligned to the road map by identifying structural features present in both the range image and the road map. At 516, the method includes selecting a partition of the range image (e.g., one of the partitions created at 506). In some examples, partitions may be selected in a particular order based on the position of the partition in the image (e.g., scanning left to right across the image from a top row of the mesh to a bottom row of the mesh). At 518, the method includes determining if all of the vertices of the selected partition are present on the surface of the road map. For example, data at each vertex of each grid (or other mesh shape, e.g., each square, triangle, etc.) is compared with a known 3D map. If all vertices are not present on the surface of the road map (e.g., "NO" at 518), the method proceeds to 520, to identify the selected partition as dynamic (e.g., indicating that content has changed, or has a difference from the 3D map that is larger than a threshold, in that portion of the range image from the time that the 3D map was generated). If all vertices are present on the surface of the road map (e.g., "YES" at 518), the method proceeds to 522 to identify that selected partition as static (e.g., indicating that content has not changed in that portion of the range image from a last iteration of the method).

At 524, the method includes determining if all partitions of the range image have been examined. If all partitions of the range image have not been examined (e.g., "NO" at 524), the method proceeds to 526 to select a next partition (which has not been evaluated to determine whether the partition is static or dynamic) and returns to 518 to examine the next partition. If all partitions of the range image have been examined (e.g., "YES" at 524), the method proceeds to 528 to subtract the partitions located on the surface of the 3D map (e.g., the static partitions). In this way, objects on the road from the LiDAR data, such as people, vehicles, etc. that are not included in the 3D road map are extracted for processing. LiDAR data that is already present in the 3D map may not be processed, since this data is already known from the 3D map. At 530, the method includes processing the non-subtracted data (e.g., the dynamic partitions) to build a 3D map of the scanned area. The 3D map may include the non-subtracted data as processed at 530 (e.g., the processed dynamic partitions) integrated with prior-processed data (processed during a prior iteration of the method) for the static partitions (e.g., associated with the subtracted data). In this way, only the changed data is processed to build a 3D map of the scanned area. If further processing requests use of the original point-cloud data, the subtracted range images may be matched to the raw LiDAR data to obtain a subtracted point cloud for efficient processing. The following provides pseudo code for the above method:

Obtain range image r_img_t at time t.
Obtain the 3D road map m_curr for the current location.
Partition range image r_img_t to r_t[n].
Extract structural features feat_img_t[n1] of r_img_t.
Extract structural features feat_m_curr[n2] of m_curr.
Register r_img_t to m_curr using feat_img_t[n1], feat_m_curr[2].
for i from 0 to n−1:
if all vertexes of r_t[i] on surface of m_curr:
r_t[i] is static
else:
r_t[i] is dynamic
endif
endfor The disclosed methods and systems collaboratively build three-dimensional maps of an area around a group of vehicles by designating each vehicle of the group to scan and process a different portion of the area. A technical effect of the above methods and systems is that the delay in performing complex scanning and data processing (e.g., LiDAR scanning and processing of LiDAR data) is reduced by leveraging the resources of other vehicles in a collaborative manner. Further resource savings may be achieved by determining static and dynamic elements of a scanned region and only processing the dynamic regions.

Figure 6:
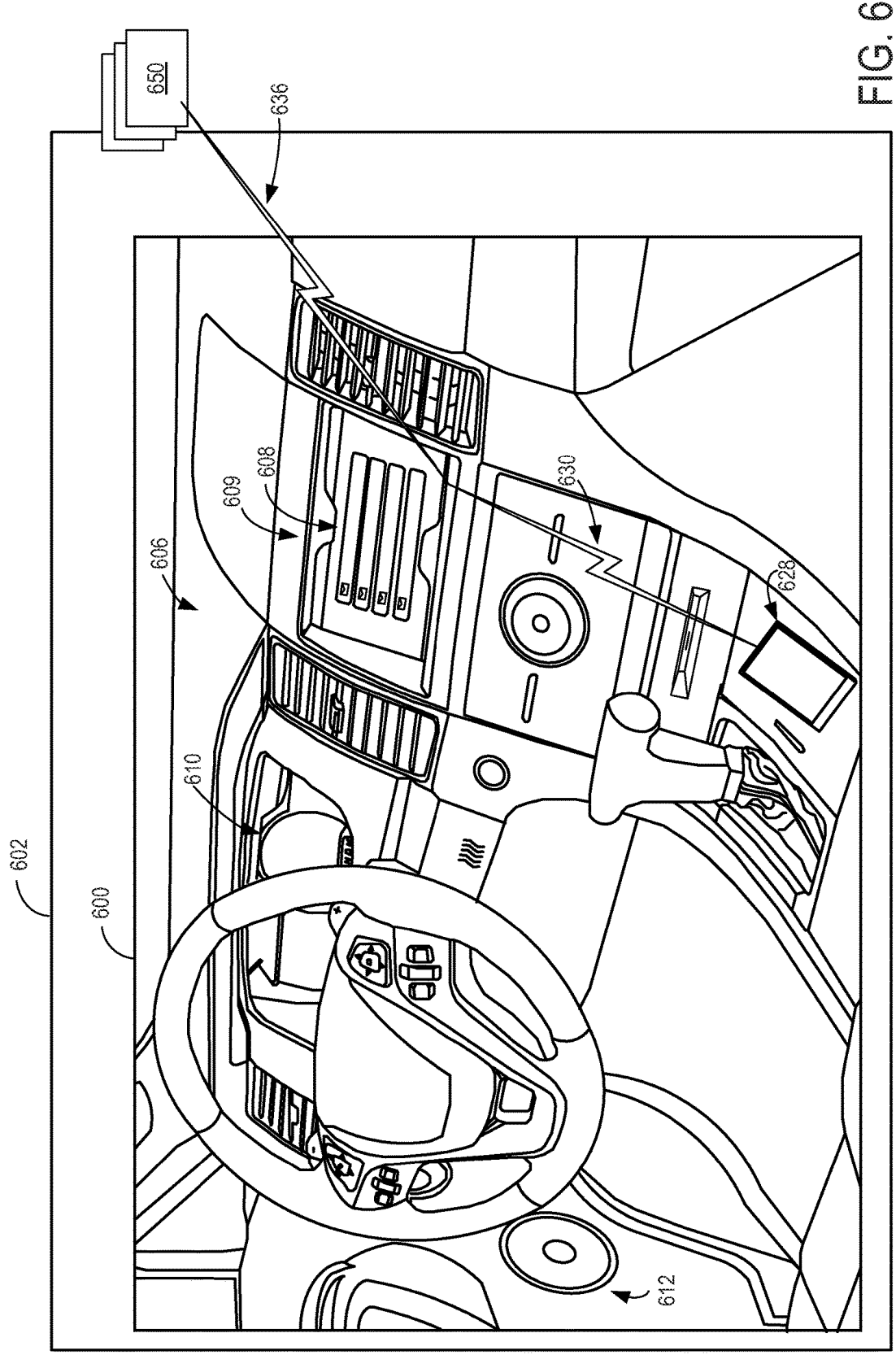
FIG. 6 shows an example partial view of a vehicle cabin in accordance with one or more embodiments of the present disclosure.

As described above, the example methods may be performed, at least in part, within a vehicle using scanning systems and processing resources of the vehicle. FIG. 6 shows an example partial view of one type of environment for a collaborative sensor processing device: an interior of a cabin 600 of a vehicle 602, in which a driver and/or one or more passengers may be seated. FIG. 6 may be an example of one or more of vehicles 104*a*-104*e* of FIG. 1.

As shown, an instrument panel 606 may include various displays and controls accessible to a driver (also referred to as the user) of vehicle 602. For example, instrument panel 606 may include a touch screen 608 of an in-vehicle computing system 609 (e.g., an infotainment system), an audio system control panel, and an instrument cluster 610. In some embodiments, one or more hardware elements of in-vehicle computing system 609, such as touch screen 608, a display screen, various control dials, knobs and buttons, memory, processor(s), and any interface elements (e.g., connectors or ports) may form an integrated head unit that is installed in instrument panel 606 of the vehicle. The head unit may be fixedly or removably attached in instrument panel 606. In additional or alternative embodiments, one or more hardware elements of the in-vehicle computing system may be modular and may be installed in multiple locations of the vehicle.

The cabin 600 may include one or more sensors for monitoring the vehicle, the user, and/or the environment. For example, the cabin 600 may include one or more microphones to receive user input in the form of voice commands and/or to measure ambient noise in the cabin 600 or outside of the vehicle (e.g., to establish a noise baseline for separating siren sounds from environmental noise and/or to detect a siren sound), etc. Sensors for scanning the environment may include one or more cameras, LiDAR arrays, and/or other optical sensors for detecting features of the environment surrounding the vehicle. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 650 and/or mobile device 628.

Cabin 600 may also include one or more user objects, such as mobile device 628, that are stored in the vehicle before, during, and/or after travelling. The mobile device 628 may include a smart phone, a tablet, a laptop computer, a portable media player, and/or any suitable mobile computing device. The mobile device 628 may be connected to the in-vehicle computing system via communication link 630. The communication link 630 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 628 may include one or more wireless communication interfaces for connecting to one or more communication links. For example, the communication link 630 may provide sensor and/or control signals from various vehicle systems (such as vehicle audio system, sensor subsystem, etc.) and the touch screen 608 to the mobile device 628 and may provide control and/or display signals from the mobile device 628 to the in-vehicle systems and the touch screen 608. In some examples, the mobile device 628 may provide additional resources for performing scanning operations (e.g., for scanning and/or for processing scanned data) and/or for negotiating between vehicles (e.g., for negotiating communication parameters or master vehicle designations between vehicles).

In-vehicle computing system 609 may also be communicatively coupled to additional devices operated and/or accessed by the user but located external to vehicle 602, such as one or more external devices 650. In the depicted embodiment, external devices are located outside of vehicle 602 though it will be appreciated that in alternate embodiments, external devices may be located inside cabin 600. The external devices may include a server computing system, personal computing system, portable electronic device, electronic wrist band, electronic head band, portable music player, electronic activity tracking device, pedometer, smart-watch, GPS system, etc. External devices 650 may be connected to the in-vehicle computing system via communication link 636 which may be wired or wireless, as discussed with reference to communication link 630, and configured to provide two-way communication between the external devices and the in-vehicle computing system. For example, external devices 650 may include one or more sensors and communication link 636 may transmit sensor output from external devices 650 to in-vehicle computing system 609 and touch screen 608.

In-vehicle computing system 609 may analyze the input received from external devices 650, mobile device 628, and/or other input sources and provide output via touch screen 608 and/or speakers 612, communicate with mobile device 628 and/or external devices 650, and/or perform other actions based on the assessment. In some embodiments, all or a portion of the assessment may be performed by the mobile device 628 and/or the external devices 650. In some embodiments, the external devices 650 may include in-vehicle computing devices of another vehicle (e.g., another vehicle grouped with vehicle 602).

Figure 7:
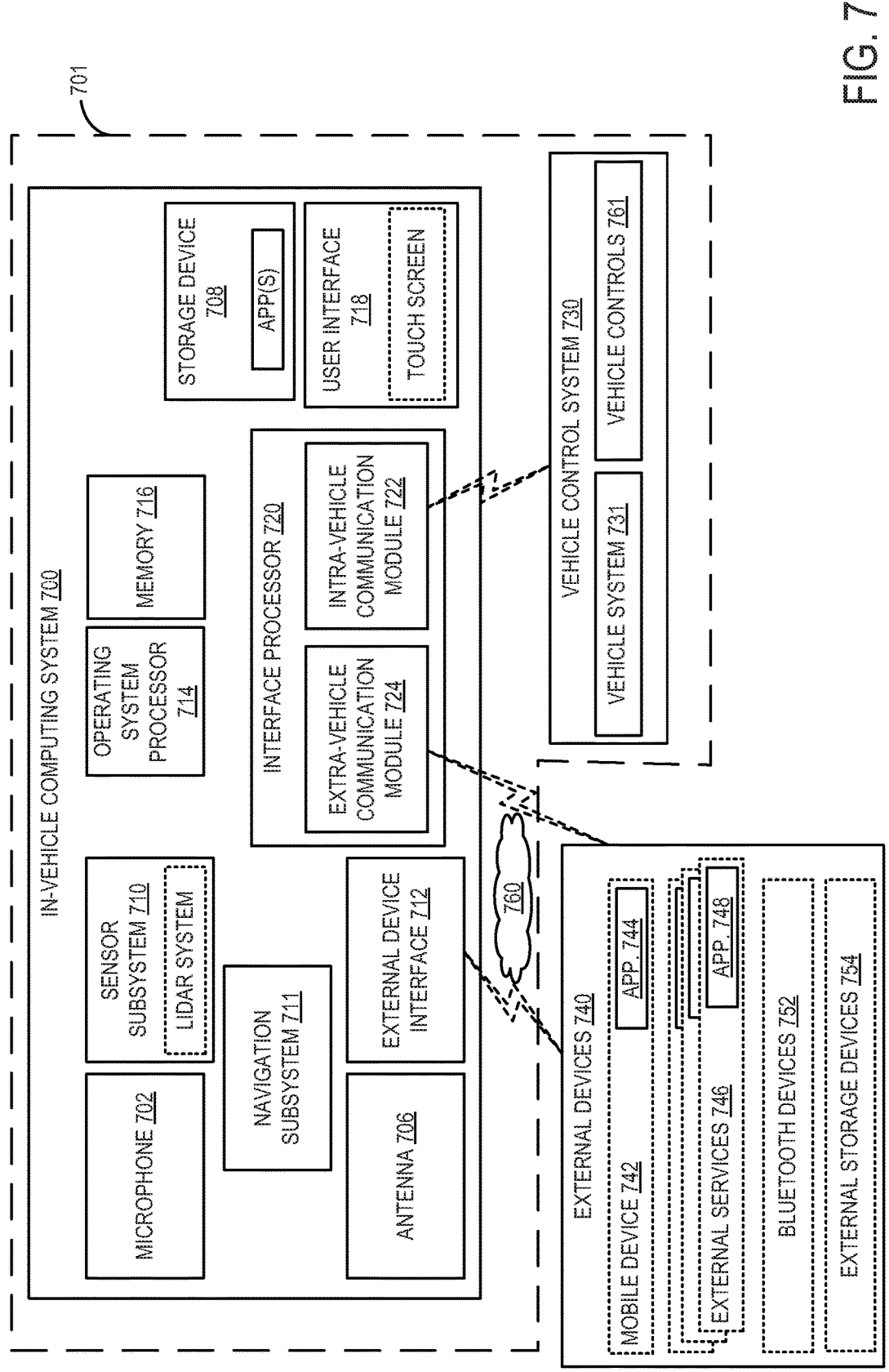
FIG. 7 shows a block diagram of an in-vehicle computing system in accordance with one or more embodiments of the present disclosure.

FIG. 7 shows a block diagram of an in-vehicle computing system 700 configured and/or integrated inside vehicle 701. In-vehicle computing system 700 may be an example of in-vehicle computing system 609 of FIG. 6 and/or may perform one or more of the methods described herein in some embodiments. In some examples, the in-vehicle computing system may be a vehicle infotainment system configured to provide information-based media content (audio and/or visual media content, including entertainment content, navigational services, map data, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 701 in order to enhance an in-vehicle experience for a driver and/or a passenger.

In-vehicle computing system 700 may include one or more processors including an operating system processor 714 and an interface processor 720. Operating system processor 714 may execute an operating system on the in-vehicle computing system, and control input/output, display, playback, and other operations of the in-vehicle computing system. Interface processor 720 may interface with a vehicle control system 730 via an intra-vehicle communication module 722.

Intra-vehicle communication module 722 may output data to other vehicle systems 731 and vehicle control elements 761, while also receiving data input from other vehicle components and systems 731, 761, e.g. by way of vehicle control system 730. When outputting data, intra-vehicle communication module 722 may provide a signal via a bus corresponding to any status of the vehicle, the vehicle surroundings (e.g., as measured by one or more microphones, cameras, LiDAR systems, or other sensors mounted on the vehicle), or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), and digital signals propagated through vehicle data networks (such as an engine controller area network [CAN] bus through which engine related information may be communicated and/or an audio-video bridging [AVB] network through which vehicle information may be communicated). For example, the in-vehicle computing system may retrieve from the engine CAN bus the current speed of the vehicle estimated by the wheel sensors, a current location of the vehicle provided by the GPS sensors, and a current trajectory of the vehicle provided by one or more inertial measurement sensors in order to determine an estimated path of the vehicle (e.g., for updating a display of the in-vehicle computing system). In addition, other interfacing protocols/hardware such as Ethernet or Bluetooth may be used as well without departing from the scope of this disclosure.

A non-volatile storage device 708 may be included in in-vehicle computing system 700 to store data such as instructions executable by processors 714 and 720 in non-volatile form. The storage device 708 may store application data to enable the in-vehicle computing system 700 to perform any of the above-described methods and/or to run an application for connecting to a cloud-based server and/or collecting information for transmission to the cloud-based server. Connection to a cloud-based server may be mediated via extra-vehicle communication module 724. The application may retrieve information gathered by vehicle systems/sensors, input devices (e.g., user interface 718), devices in communication with the in-vehicle computing system, etc. In-vehicle computing system 700 may further include a volatile memory 716. Volatile memory 716 may be random access memory (RAM). Non-transitory storage devices, such as non-volatile storage device 708 and/or volatile memory 716, may store instructions and/or code that, when executed by a processor (e.g., operating system processor 714 and/or interface processor 720), controls the in-vehicle computing system 700 to perform one or more of the actions described in the disclosure.

A microphone 702 may be included in the in-vehicle computing system 700 to measure ambient noise in the vehicle, to measure ambient noise outside the vehicle, etc. One or more additional sensors may be included in and/or communicatively coupled to a sensor subsystem 710 of the in-vehicle computing system 700. For example, the sensor subsystem 710 may include and/or be communicatively coupled to scanning sensors including a LiDAR system and/or a camera system (e.g., a rear view camera, a front view camera, side view cameras, LiDAR sensors disposed to cover a 360 degree area around the vehicle, etc.). Sensor subsystem 710 of in-vehicle computing system 700 may communicate with and receive inputs from various vehicle sensors and may further receive user inputs. While certain vehicle system sensors may communicate with sensor subsystem 710 alone, other sensors may communicate with both sensor subsystem 710 and vehicle control system 730, or may communicate with sensor subsystem 710 indirectly via vehicle control system 730. Sensor subsystem 710 may serve as an interface (e.g., a hardware interface) and/or processing unit for receiving and/or processing received signals from one or more of the sensors described in the disclosure.

A navigation subsystem 711 of in-vehicle computing system 700 may generate and/or receive navigation information such as location information (e.g., via a GPS sensor and/or other sensors from sensor subsystem 710), route guidance, traffic information, point-of-interest (POI) identification, and/or provide other navigational services for the driver. The navigation subsystem 711 may include an inertial navigation system that may further determine a position, orientation, and velocity of the vehicle via motion and rotation sensor inputs. The navigation subsystem 711 may communicate with motion and rotation sensors included in the sensor subsystem 710. Alternatively, the navigation subsystem 711 may include motion and rotation sensors and determine the movement and rotation based on the output of these sensors. Navigation subsystem 711 may transmit data to, and receive data from a cloud-based server and/or external navigation service via extra-vehicle communication module 724. The navigation subsystem 711 may provide at least a portion of data to be used during generation of a three-dimensional map of a region around the vehicle in some examples.

External device interface 712 of in-vehicle computing system 700 may be coupleable to and/or communicate with one or more external devices 740 located external to vehicle 701. While the external devices are illustrated as being located external to vehicle 701, it is to be understood that they may be temporarily housed in vehicle 701, such as when the user is operating the external devices while operating vehicle 701. In other words, the external devices 740 are not integral to vehicle 701. The external devices 740 may include a mobile device 742 (e.g., connected via a Bluetooth, NFC, WIFI direct, or other wireless connection) or an alternate Bluetooth-enabled device 752. Other external devices include external services 746. For example, the external devices may include extra-vehicular devices that are separate from and located externally to the vehicle. Still other external devices include external storage devices 754, such as solid-state drives, pen drives, USB drives, etc. External devices 740 may communicate with in-vehicle computing system 700 either wirelessly or via connectors without departing from the scope of this disclosure. For example, external devices 740 may communicate with in-vehicle computing system 700 through the external device interface 712 over network 760, a universal serial bus (USB) connection, a direct wired connection, a direct wireless connection, and/or other communication link.

One or more applications 744 may be operable on mobile device 742. As an example, mobile device application 744 may be operated to monitor an environment of the vehicle (e.g., collect audio and/or visual data of an environment of the vehicle) and/or to process audio and/or visual data received from vehicle sensors. The collected/processed data may be transferred by application 744 to external device interface 712 over network 760. Likewise, one or more applications 748 may be operable on external services 746. As an example, external services applications 748 may be operated to aggregate and/or analyze data from multiple data sources. For example, external services applications 748 may aggregate data from the in-vehicle computing system (e.g., sensor data, log files, user input, etc.), etc.

Vehicle control system 730 may include controls for controlling aspects of various vehicle systems 731 involved in different in-vehicle functions. Vehicle control system 730 may also include controls for adjusting the settings of various vehicle controls 761 (or vehicle system control elements) related to the engine and/or auxiliary elements within a cabin of the vehicle.

In-vehicle computing system 700 may further include an antenna(s) 706, which may be communicatively coupled to external device interface 712 and/or extra-vehicle-communication module 724. The in-vehicle computing system may receive positioning signals such as GPS signals and/or wireless commands via antenna(s) 706 or via infrared or other mechanisms through appropriate receiving devices.

One or more elements of the in-vehicle computing system 700 may be controlled by a user via user interface 718. User interface 718 may include a graphical user interface presented on a touch screen, such as touch screen 608 of FIG. 6, and/or user-actuated buttons, switches, knobs, dials, sliders, etc. For example, user-actuated elements may include steering wheel controls, door and/or window controls, instrument panel controls, navigation system settings, and the like. A user may also interact with one or more applications of the in-vehicle computing system 700 and mobile device 742 via user interface 718. Notifications and other messages (e.g., alerts), as well as navigational assistance (e.g., 3D maps), may be displayed to the user on a display of the user interface.

The disclosure provides for an in-vehicle computing system of a vehicle, the in-vehicle computing system including a sensor subsystem in communication with an optical sensor, a processor, and memory storing instructions executable by the processor to instruct the optical sensor to scan an assigned region around the vehicle, receive, from the optical sensor, locally scanned data corresponding to the assigned region, process the locally scanned data to build a first portion of a three-dimensional map of an environment of the vehicle, transmit the processed scanned data to at least one other vehicle, receive additional map data from the at least one other vehicle, and build a second, different portion of the three-dimensional map using the received additional map data. In a first example of the in-vehicle computing system, the optical sensor may additionally or alternatively include a Light Detection and Ranging (LiDAR) sensor system and the locally scanned data additionally or alternatively includes point-cloud data corresponding to the assigned region. A second example of the in-vehicle computing system optionally includes the first example, and further includes the in-vehicle computing system, wherein the vehicle forms a group with the at least one other vehicle based on a proximity of the at least one other vehicle. A third example of the in-vehicle computing system optionally includes one or both of the first example and the second example, and further includes the in-vehicle computing system, wherein the instructions are further executable to receive an assignment to scan the assigned region from another vehicle of the group, each vehicle of the group being assigned a different region of a collaborative scanning area around the group, the three-dimensional map corresponding to the collaborative scanning area. A fourth example of the in-vehicle computing system optionally includes one or more of the first through the third examples, and further includes the in-vehicle computing system, wherein the group is formed on an ad hoc basis to include only a selected number of neighboring vehicles, each of the vehicles in the group being separated from one another by less than a threshold distance. A fifth example of the in-vehicle computing system optionally includes one or more of the first through the fourth examples, and further includes the in-vehicle computing system, wherein the processed scanned data is transmitted to the at least one other vehicle along with a group identification associated with the group. For example, the processed scanned data may be sent as a packet or other message including or having the group identification appended thereto (e.g., included in the header). A sixth example of the in-vehicle computing system optionally includes one or more of the first through the fifth examples, and further includes the in-vehicle computing system, wherein the received additional map data is received from the at least one other vehicle along with the group identification associated with the group. For example, the additional map data may be sent as a packet or other message including or having the group identification appended thereto (e.g., included in the header). A seventh example of the in-vehicle computing system optionally includes one or more of the first through the sixth examples, and further includes the in-vehicle computing system, wherein the instructions are further executable to process the locally scanned data by converting the locally scanned data to a range image, obtaining a previously generated three-dimensional road map associated with the environment of the vehicle, subtracting static portions of the range image determined to be located on a surface of the three-dimensional road map, and processing only the non-subtracted portions of the range image to build the first portion of the three-dimensional map. An eighth example of the in-vehicle computing system optionally includes one or more of the first through the seventh examples, and further includes the in-vehicle computing system, wherein subtracting the static portions of the range image includes partitioning the range image using a mesh, registering the range image to the three-dimensional road map, and determining, for each partition of the range image, whether all vertices of the partition are included on the surface of the three-dimensional road map. A ninth example of the in-vehicle computing system optionally includes one or more of the first through the eighth examples, and further includes the in-vehicle computing system, wherein the assigned region includes an assigned range in degrees around the vehicle, and wherein the vehicle communicates with the at least one other vehicle according to a vehicle-to-vehicle communication protocol. A tenth example of the in-vehicle computing system optionally includes one or more of the first through the ninth examples, and further includes the in-vehicle computing system, wherein the vehicle-to-vehicle communication protocol defines an encryption protocol to be used for transmissions between the vehicle and the at least one other vehicle, and wherein the instructions are further executable to encrypt the processed scanned data according to the determined encryption protocol. An eleventh example of the in-vehicle computing system optionally includes one or more of the first through the tenth examples, and further includes the in-vehicle computing system, wherein the received additional map data is encrypted according to the determined encryption protocol.

The disclosure further provides for a method for performing a collaborative scanning operation at a first vehicle, the method including building a three-dimensional map of a collaborative scanning area using both locally scanned and processed data and additional map data, the additional map data being scanned and processed by at least one other vehicle and received from the at least one other vehicle via vehicle-to-vehicle communication. In a first example of the method, the additional map data additionally or alternatively is not based on data that is scanned at the first vehicle. A second example of the method optionally includes the first example, and further includes the method, wherein the locally scanned and processed data includes point-cloud data that is processed by converting the point-cloud data to a range image, registering the range image to a previously-generated road map, and subtracting data from the range image that is located on a surface of the road map. A third example of the method optionally includes one or both of the first example and the second example, and further includes the method, wherein the at least one other vehicle is grouped with the first vehicle based on a proximity of the at least one other vehicle to the first vehicle.

The disclosure further provides for an in-vehicle computing system of a first vehicle, the in-vehicle computing system including a sensor subsystem in communication with an optical sensor, a processor, and memory storing instructions executable by the processor to discover a second vehicle and a third vehicle within a threshold distance of the first vehicle, form a group with the second vehicle and the third vehicle, assign each of the first vehicle, the second vehicle, and the third vehicle a first, second, and third scan region, respectively, for scanning an environment of the group, each scan region including a portion of a collaborative scanning area around the group, scan, via the optical sensor, the first scan region and locally process resulting scanned data, send the locally processed scanned data to the second vehicle and the third vehicle, receive, from the second vehicle and the third vehicle, additional map data associated with the second scan region and third scan region, respectively, and build a three-dimensional map of the collaborative scanning area using the locally processed scanned data and the additional map data from the second and third vehicles. In a first example of the in-vehicle computing system, locally processing the resulting scanned data may additionally or alternatively be performed by locally processing only portions of the scanned data that are not located on a surface of a previously-generated road map of the first scan region. A second example of the in-vehicle computing system optionally includes the first example, and further includes the in-vehicle computing system, wherein the optical sensor includes a Light Detection and Ranging (LiDAR) sensor system, and wherein the locally scanned data includes point-cloud data corresponding to the assigned region. A third example of the in-vehicle computing system optionally includes one or both of the first example and the second example, and further includes the in-vehicle computing system, wherein the first, second, and third scan regions are assigned to the respective first, second, and third vehicles based on locations of the first, second, and third vehicles relative to one another.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 609 of FIG. 6 and/or the sensor subsystem 710 of FIG. 7. The methods may be performed by executing stored instructions with one or more logic devices (e.g., processors) in combination with one or more additional hardware elements, such as storage devices, sensors, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. An in-vehicle computing system of a vehicle, the in-vehicle computing system comprising:
a display device;
a sensor subsystem in communication with an optical sensor;
a processor; and
memory storing instructions executable by the processor to:
form a group with at least one other vehicle;
instruct the optical sensor to scan an assigned region around the vehicle, the assigned region being one of a plurality of assigned regions in a collaborative scanning area around the group, each vehicle of the group being assigned, from a master vehicle of the group or a remote device, a different respective region of the plurality of assigned regions in the collaborative scanning area around the group, two or more of the plurality of assigned regions being at least partially overlapping with one another;
receive, from the optical sensor, locally scanned data corresponding to the assigned region;
process the locally scanned data to build a first portion of a three-dimensional map of an environment of the vehicle;
transmit the processed scanned data to the at least one other vehicle;
receive additional map data from the at least one other vehicle;
build a second, different portion of the three-dimensional map using the received additional map data; and
display the three-dimensional map via the display device, the three-dimensional map corresponding to the collaborative scanning area around the group.

2. The in-vehicle computing system of claim 1, wherein the optical sensor includes a Light Detection and Ranging (LiDAR) sensor system, and wherein the locally scanned data includes point-cloud data corresponding to the assigned region.

3. The in-vehicle computing system of claim 1, wherein forming the group comprises forming the group with the at least one other vehicle based on a proximity of the at least one other vehicle and/or a predicted route of the at least one other vehicle.

4. The in-vehicle computing system of claim 3, wherein the instructions are further executable to receive an assignment to scan the assigned region from another vehicle of the group and/or from a remote, cloud-based computing system in communication with the vehicle.

5. The in-vehicle computing system of claim 3, wherein the group is formed on an ad hoc basis to include only a selected number of neighboring vehicles, each of the vehicles in the group being separated from one another by less than a threshold distance.

6. The in-vehicle computing system of claim 3, wherein the processed scanned data is transmitted to the at least one other vehicle along with a group identification associated with the group wherein the additional map data includes scanned data in a portion of the assigned region that partially overlaps with a respective assigned region that is assigned to the at least one other vehicle, and wherein the scanned data in the portion of the assigned region is used to align the received additional map data with the locally scanned data.

7. The in-vehicle computing system of claim 6, wherein the received additional map data is received from the at least one other vehicle along with the group identification associated with the group, and wherein the group is further formed based on a speed of the at least one other vehicle and traffic information in the environment of the vehicle.

8. The in-vehicle computing system of claim 1, wherein the instructions are further executable to process the locally scanned data by converting the locally scanned data to a range image, obtaining a previously generated three-dimensional road map associated with the environment of the vehicle, subtracting static portions of the range image determined to be located on a surface of the three-dimensional road map, and processing only non-subtracted portions of the range image to build the first portion of the three-dimensional map.

9. The in-vehicle computing system of claim 8, wherein subtracting the static portions of the range image includes partitioning the range image using a mesh, registering the range image to the three-dimensional road map, and determining, for each partition of the range image, whether all vertices of the partition are included on the surface of the three-dimensional road map.

10. The in-vehicle computing system of claim 1, wherein the assigned region includes an assigned range in degrees around the vehicle and wherein the vehicle communicates with the at least one other vehicle according to a vehicle-to-vehicle communication protocol.

11. The in-vehicle computing system of claim 10, wherein the vehicle-to-vehicle communication protocol defines an encryption protocol to be used for transmissions between the vehicle and the at least one other vehicle, and wherein the instructions are further executable to encrypt the processed scanned data according to the determined encryption protocol.

12. The in-vehicle computing system of claim 11, wherein the received additional map data is encrypted according to the determined encryption protocol.

13. A method for performing a collaborative scanning operation at a first vehicle, the method comprising:
forming a group with at least one other vehicle;
receiving, from a selected vehicle of the group, an assignment of a first assigned region of a collaborative scanning area around the group, the first assigned region being one of a plurality of assigned regions in the collaborative scanning area, each vehicle of the group being assigned a different respective region of the plurality of assigned regions in the collaborative scanning area, two or more of the plurality of assigned regions being non-overlapping with one another; and
building a three-dimensional map of the collaborative scanning area using both locally scanned and processed data and additional map data, the additional map data corresponding to at least one of the plurality of scanned regions other than the first assigned region, the additional map data being scanned and processed by the at least one other vehicle and received from the at least one other vehicle via vehicle-to-vehicle communication, and the locally scanned and processed data corresponding to the first assigned region.

14. The method of claim 13, wherein the additional map data is not based on data that is scanned at the first vehicle.

15. The method of claim 13, wherein the locally scanned and processed data includes point-cloud data that is processed by converting the point-cloud data to a range image, registering the range image to a previously-generated road map, and subtracting data from the range image that is located on a surface of the road map.

16. The method of claim 13, wherein the at least one other vehicle is grouped with the first vehicle based on a proximity of the at least one other vehicle to the first vehicle.

17. An in-vehicle computing system of a first vehicle, the in-vehicle computing system comprising:
a sensor subsystem in communication with an optical sensor;
a processor; and
memory storing instructions executable by the processor to:
discover a second vehicle and a third vehicle within a threshold distance of the first vehicle;
form a group with the second vehicle and the third vehicle;
assign each of the first vehicle, the second vehicle, and the third vehicle a first, second, and third scan region, respectively, for scanning an environment of the group, each scan region including a portion of a collaborative scanning area around the group, at least two of the scan regions being at least partially overlapping with one another;
send a respective assignment to each of the second vehicle and the third vehicle instructing the second vehicle and the third vehicle to scan the second scan region and the third scan region, respectively;
scan, via the optical sensor, the first scan region and locally process resulting scanned data;
send the locally processed scanned data to the second vehicle and the third vehicle;
receive, from the second vehicle and the third vehicle, additional map data associated with the second scan region and third scan region, respectively; and
build a three-dimensional map of the collaborative scanning area using the locally processed scanned data and the additional map data from the second and third vehicles.

18. The in-vehicle computing system of claim 17, wherein locally processing the resulting scanned data is performed by locally processing only portions of the scanned data that are not located on a surface of a previously-generated road map of the first scan region.

19. The in-vehicle computing system of claim 18, wherein the optical sensor includes a Light Detection and Ranging (LiDAR) sensor system, and wherein the locally scanned data includes point-cloud data corresponding to the assigned region.

20. The in-vehicle computing system of claim 17, wherein the first, second, and third scan regions are determined to be assigned to the respective first, second, and third vehicles based on locations of the first, second, and third vehicles relative to one another.

* * * * *